United States Patent [19]

McNamee

[11] Patent Number: 4,936,599
[45] Date of Patent: Jun. 26, 1990

[54] PROTECTOR SHIELD FOR THE FRONT END OF A TOWED VEHICLE

[76] Inventor: Thomas C. McNamee, 2451 Monico Dr., Oxnard, Calif. 93035

[21] Appl. No.: 387,783

[22] Filed: Aug. 1, 1989

Related U.S. Application Data

[63] Continuation-in-part of Ser. No. 208,510, Jun. 20, 1988, abandoned.

[51] Int. Cl.$^5$ .................. B60R 19/52; B60R 19/54
[52] U.S. Cl. .................. 280/770; 293/115; 296/91
[58] Field of Search .............. 280/770, 847, 848, 154; 293/112, 115; 296/91, 95.1, 152, 180.1, 180.2, 180.4

[56] References Cited

U.S. PATENT DOCUMENTS

| | | | |
|---|---|---|---|
| 1,866,265 | 7/1932 | Moss | 293/115 |
| 2,253,041 | 8/1941 | Morse | 293/115 X |
| 2,489,901 | 11/1949 | Kocinski | 296/95.1 X |
| 2,823,746 | 2/1958 | Morgan | 296/95.1 X |
| 2,872,242 | 2/1959 | Whartman et al. | 296/95.1 X |
| 2,907,384 | 10/1959 | Spratt et al. | 296/95.1 X |
| 2,944,601 | 7/1960 | Compson | 296/95.1 X |
| 2,979,129 | 4/1961 | Ketchum | 296/95.1 X |
| 3,863,728 | 2/1975 | Mittendorf | 296/91 X |
| 3,987,863 | 10/1976 | Mittendorf et al. | 296/91 X |
| 4,157,200 | 6/1979 | Johnson | 296/91 X |
| 4,262,954 | 4/1981 | Thompson | 296/91 |
| 4,706,991 | 11/1987 | Miller | 280/770 |

FOREIGN PATENT DOCUMENTS 2131756 6/1984 United Kingdom ............ 280/770

Primary Examiner—Charles A. Marmor
Assistant Examiner—Brian L. Johnson
Attorney, Agent, or Firm—Donald A. Streck

[57] ABSTRACT

A universal tow guard for mounting to the front of a towed vehicle. There are first and second planar plastic shield members having a lip around top, bottom, and outer edges thereof. Each has an upper mounting point adjacent the top outer edge and a lower mounting point adjacent the bottom outer edge. Each also has a plurality of horizontal support bracket holes adjacent the bottom edge, a plurality of horizontal strut hole vertical pairs adjacent the top edge, and a plurality of horizontal width adjustment hole vertical pairs adjacent an inner end thereof. The second shield member slidably fits within the lips of the first shield member. There are a pair of adjustable struts for connection between selected ones of the strut hole vertical pairs and a front surface of the vehicle. There are also a pair of support brackets for connection to selected ones of the support bracket holes and for resting on the vehicle bumper. Finally, there are a plurality of elastic strap members for connection between the vehicle and the upper and lower mounting points. Each strap member comprises a cord of an elastic material having a deformable material at one end formed into a hook matching contours of a point of attachment of the vehicle with the opposite end connected to one of the mounting points. There are protective sleeves of a soft, non-abrasive material disposed over the deformable material and the cord for protecting the vehicle's surface.

15 Claims, 2 Drawing Sheets

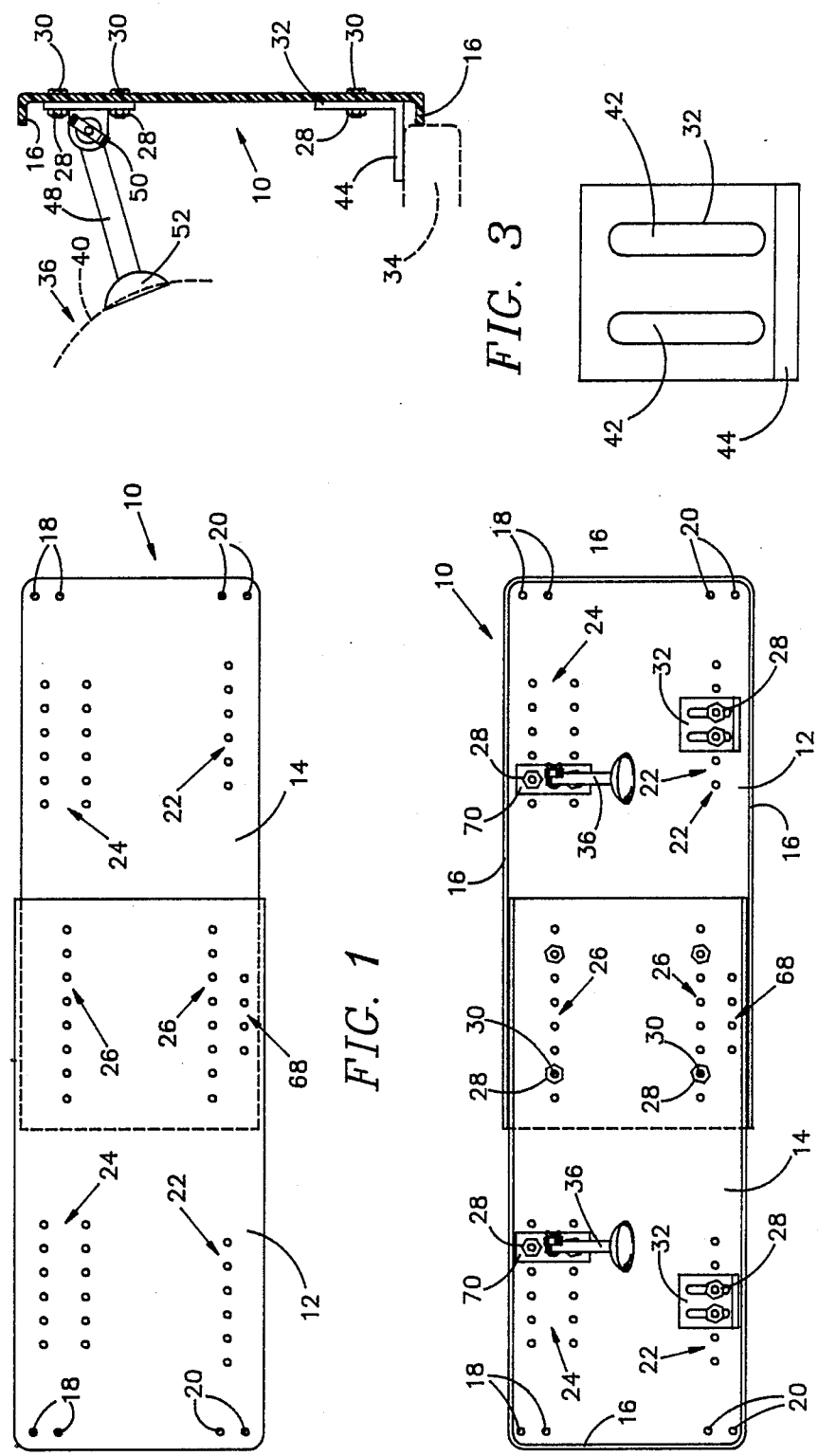

PROTECTOR SHIELD FOR THE FRONT END OF A TOWED VEHICLE

BACKGROUND OF THE INVENTION

This application is a continuation-in-part of application Ser. No. 208,510, filed 20 June 1988, now abandoned.

The application relates to protective devices for protecting the surfaces of a vehicle from damage while being towed behind another vehicle and, more particularly, to a universal tow guard for temporary mounting to the front of a towed vehicle to prevent damage thereto comprising, a first planar plastic shield member having a circumferential lip around top, bottom, and outer edges thereof, the first shield member having an upper mounting point adjacent the top edge and the outer edge and a lower mounting point adjacent the bottom edge and the outer edge, each of the mounting points comprising a pair of adjacent holes through the first shield member, the first shield member also having a plurality of horizontally disposed support bracket holes adjacent the bottom edge adjacent the lower mounting point, a plurality of horizontally disposed strut hole vertical pairs adjacent the top edge adjacent the upper mounting point, and a plurality of horizontally disposed width adjustment hole vertical pairs adjacent an inner end thereof; a second planar plastic shield member having a circumferential lip around top, bottom, and outer edges thereof, the second shield member having an upper mounting point adjacent the top edge and the outer edge and a lower mounting point adjacent the bottom edge and the outer edge, each of the mounting points comprising a pair of adjacent holes through the second shield member, the second shield member also having a plurality of horizontally disposed support bracket holes adjacent the bottom edge adjacent the lower mounting point, a plurality of horizontally disposed strut hole vertical pairs adjacent the top edge adjacent the upper mounting point, and a plurality of horizontally disposed width adjustment hole vertical pairs adjacent an inner end thereof, the second shield member being sized to have top and bottom lips thereof slidably fit between top and bottom lips of the first shield member with the width adjustment hole vertical pairs of the second shield member in vertical alignment with the width adjustment hole vertical pairs of the first shield member; a plurality of first connecting members for passing through aligned ones of the width adjustment hole vertical pairs to hold the shield members in overlapped alignment; a pair of strut means for connection between selected ones of the strut hole vertical pairs and a front surface of the vehicle; a pair of support brackets each having vertical plate means for connection to selected ones of the support bracket holes and horizontal plate means for resting on a horizontal surface adjacent the front surface of the vehicle; a plurality of second connecting members for passing through selected ones of the strut hole vertical pairs to hold the strut means to associated ones of the shield members; a plurality of third connecting members for passing through selected ones of the support bracket holes to hold the support brackets to associated ones of the shield members; and, a plurality of elastic strap members for connection between points of attachment on the vehicle and respective ones of the upper and lower mounting points, each of the elastic strap members comprising a cord of an elastic material, a strip of a deformable material capable of being formed into a hook matching contours of an associated point of attachment of the vehicle disposed at a center section of the cord, ends of the cord being connected to respective ones of the holes of the associated mounting point, and first, second and third protective sleeves of a soft, non-abrasive material disposed over the deformable material and the cord for protecting the vehicle's surface from abrasion damage, the first sleeve being disposed over the deformable material, the second sleeve being disposed over the cord between the one of the pair of holes and the hook, and the third sleeve disposed over the cord between the other of the pair of holes and the hook.

Various types of shields for the front end of a vehicle to protect it from damage from impinging articles are known in the art. For example, U.S. Pat. No. 1,866,265 of Moss shows a combined radiator guard, bumper support, and tow hook. The device apparently bolted to the bumper and chassis of the vehicle and the two uprights 1 protected the radiator from being hit by large objects. Obviously, one could have fastened a screen panel to the upright 1 to protect the radiator from smaller objects such as stones and bugs. It should be noted that the Moss device was apparently intended for semi-permanent or permanent mounting to the vehicle.

The typical method of fastening a grille guard, or the like, by bolting it to the bumper is typified by U.S. Pat. No. 2,253,041 of Morse from 1941.

The advent and availability of plastics after the second world war changed the thrust of vehicle front end protection. A typical example is the insect deflector of Whartman et al. as shown in U.S. Pat. No. 2,872,242 from 1959. Such devices could be seen through by the driver and, at the same time, created air currents over the windshield that tended to carry insects up and over the roof instead of impinging on the windshield. Note that the device is attached to the hood of the vehicle with a combination of a suction cup 70 and straps 60, 62 which pass around the hood to meet at 66. A bottom support of some sort indicated as 52 in FIG. 5 and as 54 in FIG. 6 is employed. A brace 78 from the top of the deflector to the hood ornament 76 is shown in FIG. 6. As can be appreciated, the Whartman et al. device primarily protected the windshield form bugs and nothing more. A small stone hitting the deflector would be stopped from hitting the hood or windshield in its path. Other areas of the front end of the vehicle would be struck and damaged by stones, sand, bugs, etc. in the usual fashion.

Serious protection of the front end of a vehicle in general from flying materials seems to have originated in the 1950's with what are now generically referred to as "bras". Originally made of plastic-type simulated leather materials such as those sold under the brand name Naugahide, these devices were custom made for a particular model of car (particularly so-called sports cars) and protected the vehicle finish when driving so that the car would appear spotless and undamaged when exhibited in a show.

The towing of one vehicle by another on more than occasional basis is a fairly new phenomenon. Probably the first instances of such vehicle by vehicle towing were the towing of a private vehicle behind a truck in a do-it-yourself move of one's belongings from one place to another. In such instances, the unknowing simply fastened their car behind the truck on a tow bar and towed it to the destination. Upon arriving, it was not unusual to find the front end of the towed vehicle pock marked and the finish damaged from the road materials thrown up by the rear wheels of the towing vehicle. Later, when such pitfalls of towing became known, the owner typically taped canvas or heavy paper over the front of the towed vehicle to protect it during the moving process. Since the front end of towed vehicles varies so widely, it has not been practical for companies renting the towing vehicles and the tow bars to provide a protective shield for the towed vehicle.

The advent of larger, self-propelled so-called recreational vehicles has intensified the above-described problem. Quite often, the owners of such vehicles will tow a small compact car behind the "RV". When arriving at a destination, the RV is parked and hooked up to utilities to function as a temporary living quarters and the car is used for local transportation. Thus, the car spends a lot of time in a towed position wherein it is vulnerable to front end damage. It is also attached to and removed from the RV on a regular basis. In some instances, the car may be connected and disconnected several times in one day. Thus, any "universal" protective shield must be adaptable to various configurations of car front ends while, at the same time, being able to be mounted and removed quickly and easily while being secure when in its mounted position.

More recent inventions in the vehicle front end protection art have not satisfied any of the above-described needs and problems. The 1975 patent of Mittendorf (3,863,728), for example, is directed to apparatus for protecting the front end and windshield of a vehicle from bugs. It is essentially a universal window screen (which is placed under a window on top of the sill and slidably adjusted sideward to fit between the jams) which is mounted in front of the vehicle's grill by brackets mounted to the bumper as shown in FIG. 2. A low plastic airfoil type of bug deflector (of the Whartman et al. type) is mounted along the top of the screen to deflect the bugs away from the windshield. The screen is held against the front of the vehicle by a line 42 tied between the top of the screen and a hook 43 hooked around the wheelwell of the fender 14. A series of angle brackets 40 with a rubber surface 41 bear against the front of the vehicle above the grille. While not disclosed in the patent, experience has shown that if such construction is, in fact employed, the lines 42, hooks 43, and rubber-covered brackets 40 will cause damage to the finish of the vehicle from vibration in use.

This problem was apparently recognized by Mittendorf as exemplified by his later Mittendorf et al, patent (3,987,863). The same combined screen and airfoil construction is employed as in the earlier '728 patent; however, the panels are hinged in the middle instead of being slidable adjustable and, more importantly, they are removably attached and supported by heavy brackets 32 which are permanently attached to the vehicle's bumper.

Another interesting variation of a vehicle front end protective shield which is permanently mounted on the towed vehicle is shown in the 1987 patent of Miller (4,706,991). In this case, the flexible plastic shield is mounted like a window shade and is pulled down from its rolled position when the vehicle (in this case a travel trailer) is being towed.

Wherefore, it is an object of this invention to provide a universal front end protective shield for use on towed vehicles which is adjustable to fit various vehicle shapes and sizes.

It is another object of this invention to provide a universal front end protective shield for use on towed vehicles which, once configured for a vehicle, can be mounted and removed quickly and easily.

It is still another object of this invention to provide a universal front end protective shield for use on towed vehicles which, once configured for a vehicle, can be mounted securely to the vehicle without any permanent members being attached to the vehicle for holding the shield.

Other objects and benefits of the invention will become apparent from the description which follows hereinafter when taken in conjunction with the drawing figures which accompany it.

SUMMARY

The foregoing objects have been achieved by the universal tow guard of the present invention for mounting to the front of a towed vehicle to prevent damage thereto comprising, a first planar plastic shield member having a circumferential lip around top, bottom, and outer edges thereof, the first shield member having an upper mounting point adjacent the top edge and the outer edge and a lower mounting point adjacent the bottom edge and the outer edge, the first shield member also having a plurality of horizontally disposed support bracket holes adjacent the bottom edge adjacent the lower mounting point, a plurality of horizontally disposed strut hole vertical pairs adjacent the top edge adjacent the upper mounting point, and a plurality of horizontally disposed width adjustment hole vertical pairs adjacent an inner end thereof; a second planar plastic shield member having a circumferential lip around top, bottom, and outer edges thereof, the second shield member having an upper mounting point adjacent the top edge and the outer edge and a lower mounting point adjacent the bottom edge and the outer edge, the second shield member also having a plurality of horizontally disposed support bracket holes adjacent the bottom edge adjacent the lower mounting point, a plurality of horizontally disposed strut hole vertical pairs adjacent the top edge adjacent the upper mounting point, and a plurality of horizontally disposed width adjustment hole vertical pairs adjacent an inner end thereof, the second shield member being sized to have top and bottom lips thereof slidably fit between top and bottom lips of the first shield member with the width adjustment hole vertical pairs of the second shield member in vertical alignment with the width adjustment hole vertical pairs of the first shield member; a plurality of first connecting members for passing through aligned ones of the width adjustment hole vertical pairs to hold the shield members in overlapped alignment; a pair of strut means for connection between selected ones of the strut hole vertical pairs and a front surface of the vehicle; a pair of support brackets each having vertical plate means for connection to selected ones of the support bracket holes and horizontal plate means for resting on a horizontal surface adjacent the front surface of the vehicle; a plurality of second connecting members for passing through selected ones of the strut hole vertical pairs to hold the strut means to associated ones of the shield members; a plurality of third connecting members for passing through selected ones of the support bracket holes to hold the support brackets to associated ones of the shield members; and, a plurality of elastic strap members for connection between points of attachment on the vehicle and respective ones of the upper and lower mounting points, each of the elastic strap members comprising a cord of an elastic material having a deformable material attached at one end capable of being formed into a hook matching contours of an associated point of attachment of the vehicle and means on an opposite end for connecting the cord to an associated one of the mounting points, each of the elastic strap members further comprising protective sleeve means of a soft, non-abrasive material disposed over the deformable material and the cord for protecting the vehicle's surface from abrasion damage.

In the preferred embodiment, each of the mounting points of the shield members comprises a pair of adjacent holes through the shield member and the cord is connected from one of the pair of holes slidably through the hook to the other of the pair of holes. Additionally, the protective sleeve means comprises, a first sleeve disposed over the deformable material; a second sleeve disposed over the cord between the one of the pair of holes and the hook; and, a third sleeve disposed over the cord between the other of the pair of holes and the hook. Preferably, the first, second, and third sleeves are of a felt-like material.

The preferred strut means comprises, a mounting plate having top and bottom holes therein spaced to align with selected ones of the strut hole vertical pairs; a strut arm pivotally mounted on one end to the mounting plate for vertical movement; and, holding means for releasably holding the vertical position of the strut arm at a desired orientation. Preferably, a suction cup of a soft deformable material is carried by an opposite end of the strut arm.

DESCRIPTION OF THE DRAWINGS

FIG. 1 is a front view of the slidably adjustable left and right shield members that comprise the shield of the present invention.

FIG. 2 is a back view of the slidably adjustable left and right shield members that comprise the shield of the present invention fastened together with the mounting members as configured for a particular vehicle.

FIG. 3 is a cutaway side view of the right shield member showing how the support brackets rest on the vehicle bumper to support the shield members vertically and the struts support the shield members against backwards rotation about the support brackets.

FIG. 4 is an enlarged view of one of the support brackets.

DESCRIPTION OF THE PREFERRED EMBODIMENT

Figure 5:
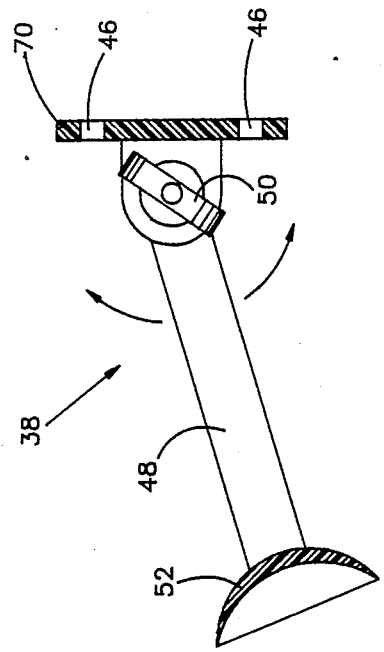
FIG. 5 is an enlarged view of one of the struts.

The tow guard of this invention is shown in FIGS. 1-5 where it is generally indicated as 10. The tow guard 10 itself comprises a right shield member 12 and a left shield member 14 which are slidably engaged with one another to provide width adjustability to the guard 10. In their commercial and preferred embodiment, the members 12, 14 are of a resiliently flexible plastic such as that referred to as ABS. The members 12, 14 are generally planar with a peripheral lip 16 about the top, bottom and outer end edges. The lip 16 adds some overall rigidity to the guard 10 as well as holding the two members 12, 14 in parallel alignment with one another.

The two members 12, 14 are each provided with a plurality of assembly and mounting holes which permit the guard 10 to be initially configured for a particular vehicle and then quickly and easily mounted and removed therefrom. Each member 12, 14 has a pair of upper strap holes 18 and a pair of lower strap holes 20 at the top and bottom, respectively, of the outer ends thereof. Each also has a horizontal row of support bracket holes 22 adjacent the bottom edge and a double horizontal row of strut holes 24 adjacent the top edge. There are also a horizontal row of width adjustment holes 26 adjacent the top and bottom edges of the member 12, 14 adjacent the inner edges.

As best seen from FIGS. 2 and 3, the members 12, 14 are slid to a position where the overall length thereof best fits the front end of the vehicle upon which the guard 10 is to be mounted. The closest holes 26 are placed in alignment and the members 12, 14 fastened together such as by nuts 28 and bolts 30 passed through several of the holes as depicted in the figures. The two L-shaped support brackets 32 are then attached to holes 22 in respective ones of the members 12, 14 which will place the brackets 32 in positions to rest on the top of the bumper 34 of the vehicle 36 in the manner shown in FIGS. 3 and 6. The two struts 38 are then attached to holes 24 in respective ones of the members 12, 14 which will place the struts 38 in positions to bear against a front surface 40 of the vehicle 36 in the manner also shown in FIGS. 3 and 6. As best seen from FIG. 4, the support brackets 32 have vertical slots 42 therein through which the mounting bolts 30 are passed. Thus, the choice of the holes 22 used provides horizontal positionability while the slots 42 provide for vertical adjustability of the bottom member 44 which rests on the bumper 34. It should be noted that the support brackets 32 only sit on the bumper 34; they do not fasten to the bumper 34 in any way as in the prior art.

As best seen in FIG. 5, the struts 38 each comprise a mounting plate 70 with top and bottom holes 46 therein spaced to align with respective vertical pairs of the holes 24. A strut arm 48 is pivotally mounted to the mounting plate 70 for vertical movement as indicated by the arrows. The vertical position of the strut arm 48 can be held at a desired point by tightening the wingnut 50. The outer end of the strut arm 48 has a deformable soft plastic suction cup 52 thereon. Thus, the choice of holes 24 used provides horizontal positionability while vertical pivoting of the strut arm 48 provides for vertical adjustability of the suction cup 52 which rests against the front surface 40 of the vehicle 36. The soft plastic of the suction cup 52 allows the suction cup 52 to deform to fit contours of the front surface 40 of the vehicle 36 so as to prevent any chafing and damaging of the vehicle's finish.

Figure 7:
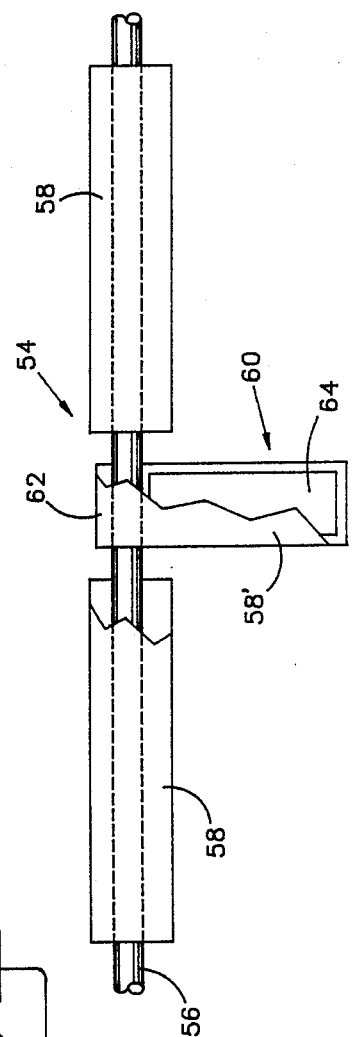
FIG. 7 is a detailed, partially cutaway drawing of the preferred retention strap system of this invention.
Figure 6:
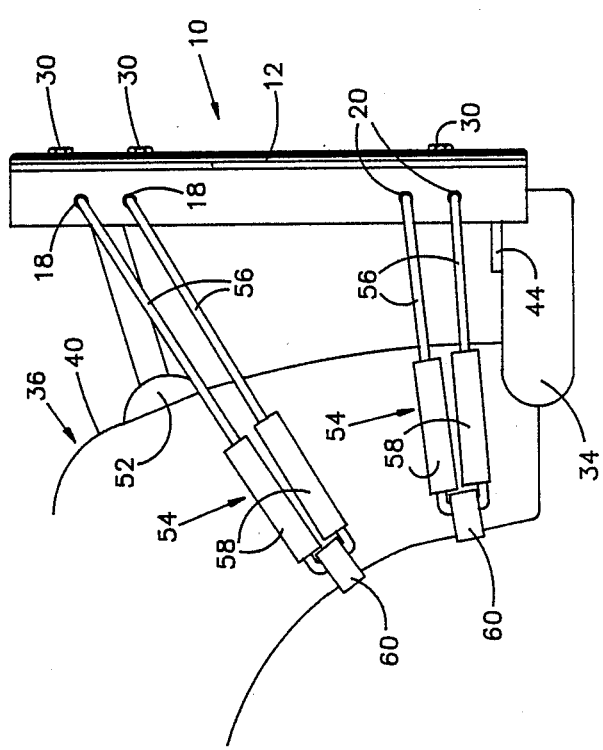
FIG. 6 is a side view showing how the preferred retention strap system securely hold the shield of this invention in place without damage to the finish of the vehicle.

The tow shield 10 of this invention is held securely in place without damage to the finish of the vehicle 36 in the manner shown in FIG. 6 by the unique mounting straps of FIG. 7. Each mounting strap 54 comprises an elastic cord 56 of the type referred to as a "bungie cord" with protective sleeves 58 disposed on opposite sides of a protective, deformable hook 60. As can be seen from the partially cutaway drawing of FIG. 7, the hook 60 comprises a sleeve 58' having a loop 62 formed in one end through which the cord 56 is passed. A metal strip 64 of aluminum or the like is disposed within the remainder of the sleeve 58'. The metal strip 64 can thus be hand formed into a hook 60 having a protective covering which will fit exactly to the contours of a given point of attachment to the vehicle 36 such as the edge of the fender well as depicted in FIG. 6. To attach the shield 10 using the straps 54, the sleeve 58' is first put onto the cord 56 and one of the sleeves 58 is threaded onto the cord 56 on each side of the sleeve 58'. The first time the shield 10 is mounted, one end of the cord 56 is inserted through one of a pair of strap holes such as the upper strap holes 18 and knotted. The hook 60 is then formed around the desired point of attachment and the other end of the cord is inserted through the other of the pair of strap holes, tightened, and knotted. Thereafter, the hook 60 is merely placed about its point of attachment by stretching the cord 56. Note from the side view of FIG. 6 how the mounting straps 54 tend to hold the shield firmly in place on the front of the vehicle 36. The support bracket 32 resting on the bumper 34 supports the shield vertically. The mounting strap 54 connected to the lower strap holes 20 on each side holds the support brackets 32 down and against the bumper 34. The mounting strap 54 connected to the upper strap holes 18 on each side holds the struts 38 against the front of the vehicle 36 at their points of contact.

The sleeves 58, 58' are preferably made of a felt or felt-like material. Thus, as the cords 56 vibrate from the passage of wind thereby and the motion of the vehicle, the finish of the vehicle 36 is only bumped with a soft felt and not abraded by continual rubbing with a more abrasive material such as rope or line (or even an uncovered bungie cord). Thus, damage to the surface and finish of the vehicle 36 is avoided as was a major object of the invention.

In the preferred and commercial version of the above-described tow guard 10 of the present invention, there are a plurality of lower strap holes 68 along the bottom edges of the members 12 towards the center thereof to which one or more straps 54 can be connected. This has been found to be useful in certain installations. For example, while the term "bumper" has been used throughout the above description and an automobile bumper is depicted in the drawings, the support brackets 32 may, in fact, rest on a portion of a tow bar forward of the vehicle bumper. Additionally, the center of the shield 10 may be notched at the bottom to fit over the tow bar and thereby cover the entire front of the vehicle. In such instances, a more secure fastening of the shield 10 to the vehicle 36 has been achieved by employing additional straps 54 at the center bottom of the shield 10.

Thus, it can be seen that the tow guard 10 of the present invention as described above has truly met its stated objectives by providing a universal tow guard for preventing damage to the front end of a towed vehicle which is easy to mount and remove from the vehicle and which requires no permanent mounting hardware to be attached to the vehicle.

Wherefore, having thus described my invention, what is claimed is:

1. A universal tow guard for mounting to the front of a towed vehicle to prevent damage thereto comprising:
   (a) a first planar plastic shield member having a circumferential lip around top, bottom, and outer edges thereof, said first shield member having an upper mounting point adjacent said top edge and said outer edge and a lower mounting point adjacent said bottom edge and said outer edge, said first shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof;
   (b) a second planar plastic shield member having a circumferential lip around top, bottom, and outer edges thereof, said second shield member having an upper mounting point adjacent said top edge and said outer edge and a lower mounting point adjacent said bottom edge and said outer edge, said second shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof, said second shield member being sized to have top and bottom lips thereof slidably fit between top and bottom lips of said first shield member with said width adjustment hole vertical pairs of said second shield member in vertical alignment with said width adjustment hole vertical pairs of said first shield member;
   (c) a plurality of first connecting members for passing through aligned ones of said width adjustment hole vertical pairs to hold said shield members in overlapped alignment;
   (d) a pair of strut means for connection between selected ones of said strut hole vertical pairs and a front surface of the vehicle;
   (e) a pair of support brackets each having vertical plate means for connection to selected ones of said support bracket holes and horizontal plate means for resting on a horizontal surface adjacent said front surface of the vehicle;
   (f) a plurality of second connecting members for passing through selected ones of said strut hole vertical pairs to hold said strut means to associated ones of said shield members;
   (g) a plurality of third connecting members for passing through selected ones of said support bracket holes to hold said support brackets to associated ones of said shield members; and,
   (h) a plurality of elastic strap members for connection between points of attachment on the vehicle and respective ones of said upper and lower mounting points, each of said elastic strap members comprising a cord of an elastic material having a deformable material attached at one end capable of being formed into a hook matching contours of an associated point of attachment of the vehicle and means on an opposite end for connecting said cord to an associated one of said mounting points, each of said elastic strap members further comprising protective sleeve means of a soft, non-abrasive material disposed over said deformable material and said cord for protecting the vehicle's surface from abrasion damage.

2. The universal tow guard of claim 1 wherein:
   (a) each of said mounting points of said shield members comprises a pair of adjacent holes through the shield member; and, (b) said cord is connected from one of said pair of holes slidably through said hook to the other of said pair of holes.

3. The universal tow guard of claim 2 wherein said protective sleeve means comprises:
   (a) a first sleeve disposed over said deformable material;
   (b) a second sleeve disposed over said cord between said one of said pair of holes and said hook; and,
   (c) a third sleeve disposed over said cord between said other of said pair of holes and said hook.

4. The universal tow guard of claim 3 wherein:
   said first, second, and third sleeves are of a felt-like material.

5. The universal tow guard of claim 1 wherein each of said strut means comprises:
   (a) a mounting plate having top and bottom holes therein spaced to align with selected ones of said hole vertical pairs;
   (b) a strut arm pivotally mounted on one end to said mounting plate for vertical movement; and,
   (c) holding means for releasably holding the vertical position of said strut arm at a desired orientation.

6. The universal tow guard of claim 5 and additionally comprising:
   a suction cup of a soft deformable material carried by an opposite end of said strut arm.

7. A universal tow guard for temporary mounting to the front of a towed vehicle to prevent damage thereto comprising:
   (a) a first planar plastic shield member having a circumferential lip around top, bottom, and outer edges thereof, said first shield member having an upper mounting point adjacent said top edge and said outer edge and a lower mounting point adjacent said bottom edge and said outer edge, said first shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof;
   (b) a second planar plastic shield member having a circumferential lip around top, bottom, and outer edges thereof, said second shield member having an upper mounting point adjacent said top edge and said outer edge and a lower mounting point adjacent said bottom edge and said outer edge, said second shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof, said second shield member being sized to have top and bottom lips thereof slidably fit between top and bottom lips of said first shield member with said width adjustment hole vertical pairs of said second shield member in vertical alignment with said width adjustment hole vertical pairs of said first shield member, each of said mounting points of said shield members comprising a pair of adjacent holes through the shield member;
   (c) a plurality of first connecting members for passing through aligned ones of said width adjustment hole vertical pairs to hold said shield members in overlapped alignment;
   (d) a pair of strut means for connection between selected ones of said strut hole vertical pairs and a front surface of the vehicle;
   (e) a pair of support brackets each having vertical plate means for connection to selected ones of said support bracket holes and horizontal plate means for resting on a horizontal surface adjacent said front surface of the vehicle;
   (f) a plurality of second connecting members for passing through selected ones of said strut hole vertical pairs to hold said strut means to associated ones of said shield members;
   (g) a plurality of third connecting members for passing through selected ones of said support bracket holes to hold said support brackets to associated ones of said shield members; and,
   (h) a plurality of elastic strap members for connection between points of attachment on the vehicle and respective ones of said upper and lower mounting points, each of said elastic strap members comprising a cord of an elastic material having a deformable material attached at one end capable of being formed into a hook matching contours of an associated mounting point of the vehicle and means on an opposite end for connecting said cord to an associated one of said mounting points, each of said elastic strap members further comprising protective sleeve means of a soft, non-abrasive material disposed over said deformable material and said cord for protecting the vehicle's surface from abrasion damage, said cord being connected from one of said pair of holes of an associated mounting point slidably through said hook to the other of said pair of holes thereof.

8. The universal two guard of claim 7 wherein said protective sleeve means comprises:
   (a) a first sleeve disposed over said deformable material;
   (b) a second sleeve disposed over said cord between said one of said pair of holes and said hook; and,
   (c) a third sleeve disposed over said cord between said other of said pair of holes and said hook.

9. The universal tow guard of claim 8 wherein:
   said first, second, and third sleeves are of a felt-like material.

10. The universal tow guard of claim 7 wherein each of said strut means comprises:
    (a) a mounting plate having top and bottom holes therein spaced to align with selected ones of said strut hole vertical pairs;
    (b) a strut arm pivotally mounted on one end to said mounting plate for vertical movement; and,
    (c) holding means for releasably holding the vertical position of said strut arm at a desired orientation.

11. The universal tow guard of claim 10 and additionally comprising:
    a suction cup of a soft deformable material carried by an opposite end of said strut arm.

12. A universal tow guard for temporary mounting to the front of a towed vehicle to prevent damage thereto comprising:
    (a) a first planar plastic shield member having a circumferential lip around top, bottom, and outer edges thereof, said first shield member having an upper mounting point adjacent said top edge and said outer edge and a lower mounting point adjacent said bottom edge and said outer edge, each of said mounting points comprising a pair of adjacent holes through said first shield member, said first shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof;

(b) a second planar plastic shield member having a circumferential lip around top, bottom, and outer edges thereof, said second shield member having an upper mounting point adjacent said top edge and said outer edge and a lower mounting point adjacent said bottom edge and said outer edge, each of said mounting points comprising a pair of adjacent holes through said second shield member, said second shield member also having a plurality of horizontally disposed support bracket holes adjacent said bottom edge adjacent said lower mounting point, a plurality of horizontally disposed strut hole vertical pairs adjacent said top edge adjacent said upper mounting point, and a plurality of horizontally disposed width adjustment hole vertical pairs adjacent an inner end thereof, said second shield member being sized to have top and bottom lips thereof slidably fit between top and bottom lips of said first shield member with said width adjustment hole vertical pairs of said second shield member in vertical alignment with said width adjustment hole vertical pairs of said first shield member;

(c) a plurality of first connecting members for passing through aligned ones of said width adjustment hole vertical pairs to hold said shield members in overlapped alignment;

(d) a pair of strut means for connection between selected ones of said strut hole vertical pairs and a front surface of the vehicle;

(e) a pair of support brackets each having vertical plate means for connection to selected ones of said support bracket holes and horizontal plate means for resting on a horizontal surface adjacent said front surface of the vehicle;

(f) a plurality of second connecting members for passing through selected ones of said strut hole vertical pairs to hold said strut means to associated ones of said shield members;

(g) a plurality of third connecting members for passing through selected ones of said support bracket holes to hold said support brackets to associated ones of said shield members; and, (h) a plurality of elastic strap members for connection between points of attachment on the vehicle and respective ones of said upper and lower mounting points, each of said elastic strap members comprising, (h1) a cord of an elastic material, (h2) a strip of a deformable material capable of being formed into a hook matching contours of an associated point of attachment of the vehicle disposed at a center section of said cord, ends of said cord being connected to respective ones of said holes of the associated mounting point, and (h3) first, second and third protective sleeves of a soft, non-abrasive material disposed over said deformable material and said cord for protecting the vehicle's surface from abrasion damage, said first sleeve being disposed over said deformable material, said second sleeve being disposed over said cord between said one of said pair of holes and said hook, and said third sleeve disposed over said cord between said other of said pair of holes and said hook.

13. The universal tow guard of claim 12 wherein:
said first, second, and third sleeves are of a felt-like material.

14. The universal tow guard of claim 12 wherein each of said strut means comprises:

(a) a mounting plate having top and bottom holes therein spaced to align with selected ones of said strut hole vertical pairs;

(b) a strut arm pivotally mounted on one end to said mounting plate for vertical movement; and, (c) holding means for releasably holding the vertical position of said strut arm at a desired orientation.

15. The universal tow guard of claim 14 and additionally comprising:
a suction cup of a soft deformable material carried by an opposite end of said strut arm.

* * * * *